United States Patent
Learman et al.

(10) Patent No.: US 6,417,786 B2
(45) Date of Patent: *Jul. 9, 2002

(54) VEHICLE NAVIGATION SYSTEM WITH REMOVABLE POSITIONING RECEIVER

(75) Inventors: Stephen James Learman, Saline; Clifford Krapfl, Grosse Pointe Park, both of MI (US)

(73) Assignee: Lear Automotive Dearborn, Inc., Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/197,968

(22) Filed: Nov. 23, 1998

(51) Int. Cl.[7] ............................................... G08G 1/123
(52) U.S. Cl. ...................... 340/988; 340/961; 342/457; 701/213
(58) Field of Search ................................. 340/988, 461; 342/357, 457; 701/35, 213, 207; 307/9.1; 455/345–348; 361/679, 728, 807

(56) References Cited

U.S. PATENT DOCUMENTS

| | | | |
|---|---|---|---|
| 5,334,974 A | 8/1994 | Simms et al. | 340/990 |
| 5,422,816 A | 6/1995 | Sprague et al. | 342/357 |
| 5,438,518 A | 8/1995 | Bianco et al. | 340/995 |
| 5,528,518 A | 6/1996 | Bradshaw et al. | 364/561 |
| 5,712,899 A * | 1/1998 | Pace, II | 340/988 |
| 5,760,742 A * | 6/1998 | Branch et al. | 342/457 |
| 5,774,827 A | 6/1998 | Smith, Jr. et al. | 340/990 |
| 5,819,199 A | 10/1998 | Kawai et al. | 340/990 |
| 5,859,628 A * | 1/1999 | Ross et al. | 340/990 |
| 5,878,395 A * | 3/1999 | Bennett | 704/275 |
| 5,887,269 A * | 3/1999 | Brunts et al. | 340/990 |
| 5,917,435 A * | 6/1999 | Kamiya et al. | 340/988 |
| 6,007,372 A * | 12/1999 | Wood | 439/502 |
| 6,032,089 A * | 2/2000 | Buckley | 701/36 |
| 6,125,326 A * | 9/2000 | Ohmura et al. | 701/213 |

* cited by examiner

*Primary Examiner*—Brent A. Swarthout
(74) *Attorney, Agent, or Firm*—Brooks & Kushman P.C.

(57) ABSTRACT

A navigation system includes a portable receiver unit that can be carried about by hand and used by an individual to determine position information through a global positioning system. The portable receiver is supported within a housing that is selectively received by and removable from a docking station that is permanently mounted within a vehicle. The housing supports a first display that provides an indication of position information to an individual utilizing the portable receiver unit. A second display is provided within the vehicle to provide an indication of vehicle position information whenever the housing is received within the docking station in the vehicle. An electronic controller associated with the vehicle preferably controls the activation states of the first and second displays when the receiver housing is received within the docking station.

15 Claims, 1 Drawing Sheet

VEHICLE NAVIGATION SYSTEM WITH REMOVABLE POSITIONING RECEIVER

BACKGROUND OF THE INVENTION

This invention generally relates to vehicle navigation systems and more particularly to a system that includes a receiver that is selectively removable from the vehicle.

Navigation systems are becoming increasingly popular in passenger vehicles. Typical systems include a global positioning system receiver that is mounted permanently within the vehicle. The receiver typically communicates with a satellite-based global positioning system and receives position information, which is converted into some form of display for the vehicle operator indicating g the position of the vehicle relative to previously determined reference points or other known landmarks on a given map database.

In most situations, the global position information is utilized as a navigation or route-guidance system to assist a driver of a vehicle in arriving at a chosen destination. Other functions are commonly available such as providing maps regarding areas surrounding a vehicle location.

While vehicle navigation systems are becoming increasingly popular, they are not without limitation. Those skilled in the art are always striving to make improvements. One shortcoming of currently available systems is that the receiver is only useful to a person occupying the vehicle. This invention provides a substantial improvement by incorporating a portable receiver into the vehicle that is selectively removable and usable by a person, even when they are outside of the vehicle. A system designed according to this invention is especially useful in situations, for example, where an individual drives their vehicle to a particular location and then leaves the vehicle on a hike. The selectively removable receiver incorporated with this invention not only guides the individual to the location while in the vehicle but also serves as a navigation guide during the hike, for example.

SUMMARY OF THE INVENTION

In general terms, this invention is a navigation system that is useful in association with a vehicle. A housing supports a receiver that is adapted for communication with a remote satellite or other global positioning system arrangement. The housing also supports a display, which is useful for communicating information to an individual utilizing the system. A docking station is supported within a vehicle that selectively receives the housing so that the receiver can be selectively used within or outside of the vehicle.

In the preferred embodiment, a second display is supported within the vehicle. Whenever the housing is received within the docking station in the vehicle, the second display preferably is activated for displaying the information available through the receiver. An electronic controller preferably is provided on the vehicle for handling close communications with the receiver when the housing is received within the docking station.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENT

Figure 1:
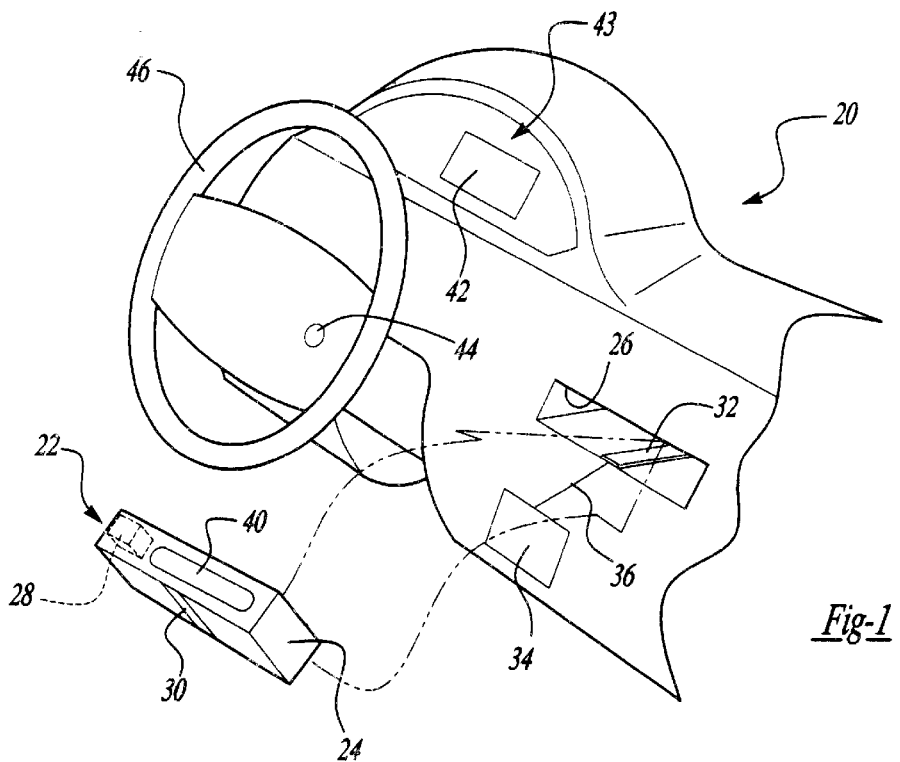
FIG. 1 is a diagrammatic and schematic illustration of a system designed according to this invention.

FIG. 1 illustrates a navigation system 20 for use in association with a vehicle. A portable receiver unit 22 includes a housing 24 that is selectively received within a docking station 26, which is permanently supported within the vehicle. The housing 24 is selectively removable from the docking station 26 so that the receiver unit 22 can be carried about by an individual while walking or riding a bike, for example.

The receiver unit 22 includes conventional electronics that allow the receiver unit 22 to be used in association with a satellite-based global positioning system (not illustrated), for example. The receiver unit 22 receives information from the global positioning system, which indicates the position or location of the receiver unit 22 relative to known landmarks from a map database.

The receiver unit 22 of this invention differs from prior global positioning receivers in several respects. The housing 24 preferably supports a close communications module 28. A first electronic coupling 30 also is supported on the housing 24. A second electronic coupling 32 preferably is supported within the docking station 26 on the vehicle. When the housing 24 is received within the docking station 26, a connection between the first and second electronic couplings 30 and 32 allows for communication between the close communications module 28 and an electronic controller 34 supported on the vehicle through a communications link schematically illustrated at 36.

The electronic controller 34 preferably communicates with the receiver unit 22 through the close communications module 28 for a variety of purposes. One reason why communications between the electronic controller 34 and the close communications module 28 is desired is to control the display of information available through the positioning receiver unit 22. The housing 24 preferably supports a first display screen 40 that provides a display regarding the location of the receiver unit 22. Since the housing 24 preferably is portable (i.e., it is easily carried about by an individual while walking) the display 40 necessarily will be limited in size and available features. Further, the capabilities of the display 40 necessarily will be limited by the power available through a battery within the portable receiver unit 22.

The system 20 designed according to this invention preferably includes a second display 42, which is shown on an instrument panel 43 in the embodiment of FIG. 1. In the preferred embodiment, once the housing 24 is received within the docking station 26 and the electronic couplings 30 and 32 are interconnected, the electronic controller 34 activates the second display 42. Once activated, the second display 42 provides the global positioning information to the driver of the vehicle, for example. Since the display 42 preferably is permanently supported on the vehicle, there is greater capability for multi-colored displays, larger display area and a greater variety of features that can be provided to the vehicle operator.

In the most preferred embodiment, the receiver unit 22 provides a display on the first display screen 40 whenever the receiver unit is activated and the housing 24 is not received within the docking station 26. Upon placing the receiver unit 22 within the docking station 26, the electronic controller 34 and the close communication module 28 preferably communicate such that the display 40 is deactivated. At that point, all display preferably is provided through the second display 42.

Deactivating the first display 40 when the receiver unit 22 is received within the docking station 26 in the vehicle is preferred for at least two reasons. First, power can be conserved by not providing a duplicate display. Secondly, the second display 42 not only has greater capability but preferably is positioned within the vehicle to provide easier access to a vehicle operator or passenger, which enhances the efficiency, usefulness and safety of the overall system while driving.

Additionally, in the most preferred embodiment the electronic couplings 30 and 32 provide for supplying power to the portable receiver unit 22 while the housing 24 is received within the docking station 26. Power available through the vehicle preferably is provided to the receiver unit 22 so that a battery supported within the housing 24 is charged for longer use upon the next removal of the housing 24. Additionally, all power for operating the receiver unit 22 preferably is provided by the vehicle power supply whenever the housing 24 is appropriately received within the docking station 26.

The preferred embodiment also includes a manually operable switch 44, which is illustrated supported on a steering wheel 46. The switch 44 preferably allows the vehicle operator to choose between operation modes for the first and second displays 40 and 42. In some situations, for example, it may be useful for a driver of the vehicle to utilize the display on the second display 42 while a passenger, who is assisting the driver in navigating the vehicle, utilizes the first display 40 even while the housing 24 is received within the docking station 26.

Figure 2:
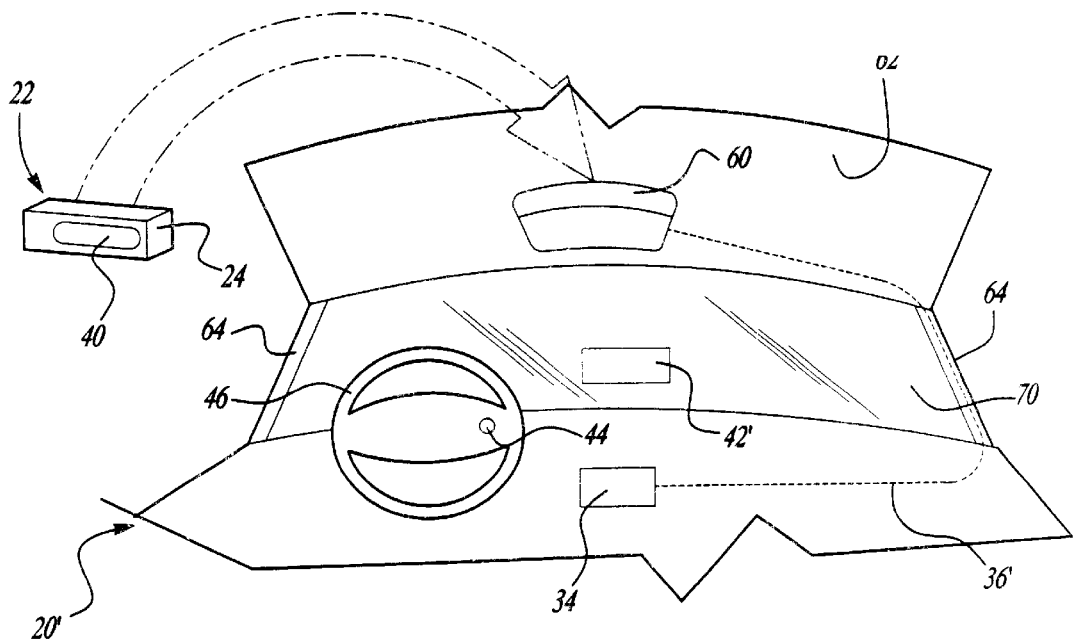
FIG. 2 is a diagrammatic and schematic illustration of another embodiment of a system designed according to this invention.

FIG. 2 illustrates an alternative embodiment of this invention. The system 20' includes a docking station 60 that is part of an overhead console supported on a headliner 62 within the vehicle. The communication link schematically illustrated at 36' preferably includes a direct, hard wire connection, which can run through the A pillars 64 of the vehicle. The communication link 36' enables communication between the electronic controller 34 and the receiver unit 22 when it is received in the docking station 60 for the reasons described with respect to the embodiment of FIG. 1.

Another difference between the embodiment shown in FIG. 2 and that of FIG. 1 is that the second display 42' is an image projected directly onto the windshield 70 of the vehicle. By projecting the image of information available through the positioning receiver unit 22 onto the windshield 70, a driver and passenger of a vehicle can both readily interpret and utilize the available information. Given this description, those skilled in the art will be able to choose from among commercially available microprocessors and to develop any customized circuitry or software necessary to realize the receiver unit 22, the electronic controller 34 and the display systems necessary to accomplish the displays.

Of course, variations of the two disclosed embodiments are within the scope of this invention. For example, two second displays may be provided or the vehicle operator may be given the option of having the second display be on the instrument panel or projected onto the windshield, for example. The activation of the various displays within the vehicle preferably is at the discretion of the driver and can be accomplished through manipulation of the switch 44.

Other variations may become apparent to those skilled in the art that do not necessarily depart from the purview and spirit of this invention. The scope of legal protection given to this invention is to be limited only by the following claims.

What is claimed is:

1. A navigation system for use with a vehicle, comprising:
   a housing;
   a receiver supported within the housing that receives signals that are indicative of a position of the receiver;
   a display supported by the housing for displaying information regarding the position of the receiver relative to previously determined reference points;
   a docking station supported within the vehicle that selectively receives the housing so that the receiver is usable within the vehicle and is selectively removable from the vehicle to be used remote from the vehicle;
   a second display supported in the vehicle and an electronic controller associated with the vehicle wherein the electronic controller activates the second display to display information regarding location of the vehicle when the housing is received in the docking station; and
   at least one switch remotely located from the housing, wherein the switch is manipulatable to select which displays will display the information regarding location of the vehicle.

2. The system of claim 1, wherein the second display is activated and the display supported on the housing is deactivated when the housing is received in the docking station.

3. The system of claim 1, wherein the second display is supported on an instrument panel within the vehicle.

4. The system of claim 1, wherein the second display is projected onto a windshield of the vehicle.

5. The system of claim 1, further comprising a close communication module supported by the housing.

6. The system of claim 5, further comprising an electronic controller supported on the vehicle and a first electronic coupling supported on the housing and a second electronic coupling associated with the docking station and wherein the first and second electronic couplings facilitate communication between the close communication module and the electronic controller.

7. The system of claim 6, further comprising a battery supported within the housing and wherein the battery is charged when the housing is received within the docking station.

8. The system of claim 7, further comprising a second display supported within the vehicle and wherein the second display is activated and the display supported on the housing is deactivated while the battery is charged.

9. The system of claim 6, further comprising a second display supported within the vehicle that is activated by the electronic controller upon an interconnection between the first and second electronic couplings.

10. A vehicle navigation system, comprising:
    a docking station supported within the vehicle;
    a housing that is selectively received by and removable from the docking station;
    a receiver support within housing that receives signals that are indicative of a position of the receiver;
    a first display supported on the housing that displays information indicative of the position of the receiver relative to established reference points;
    a second display supported within the vehicle that displays information indicative of the location of the vehicle relative to the established reference points when the housing is received by the docking station; and at least one switch remotely located from the housing wherein the switch is manipulatable to select between available activation states of the first display and the second display, respectively.

11. The system of claim 10, further comprising a first electronic coupling supported on the housing and a second electronic coupling supported within the docking station so that the first and second electronic couplings are coupled together upon receipt of the housing by the docking station.

12. The system of claim 11, further comprising a close communication module supported by the housing and an electronic controller supported on the vehicle and wherein the close communication module and the electronic controller communicate through the coupling of the first and second electronic couplings.

13. The system of claim 11, further comprising a battery supported by the housing that provides power to the receiver when the housing is selectively removed from the docking station and wherein the battery receives charging power through the coupling between the first and second electronic couplings.

14. The system of claim 10, further comprising an electronic controller supported on the vehicle and a manually operable switch for generating a signal that is utilized by the electronic controller to control an activation state of the first and second displays, respectively.

15. The system of claim 10, wherein the docking station is supported on an overhead console on a headliner within the vehicle.

* * * * *